May 16, 1967 TADAHIRO SEKIMOTO ET AL 3,320,611

TIME-DIVISION RADIO RELAY COMMUNICATION SYSTEM

Filed March 30, 1965 3 Sheets-Sheet 1

INVENTORS
TADAHIRO SEKIMOTO
HISASHI KANEKO

BY

OSTROLENK, FABER, GERB & SOFFEN

ATTORNEYS

May 16, 1967 TADAHIRO SEKIMOTO ET AL 3,320,611

TIME-DIVISION RADIO RELAY COMMUNICATION SYSTEM

Filed March 30, 1965

3 Sheets-Sheet 2

INVENTORS
TADAHIRO SEKIMOTO
HISASHI KANEKO
BY
OSTROLENK, FABER, GERB & SOFFEN
ATTORNEYS

INVENTORS
TADAHIRO SEKIMOTO
HISASHI KANEKO
BY
OSTROLENK, FABER, GERB & SOFFEN
ATTORNEYS

United States Patent Office 3,320,611

Patented May 16, 1967

3,320,611

TIME-DIVISION RADIO RELAY COMMUNICATION SYSTEM

Tadahiro Sekimoto and Hisashi Kaneko, Tokyo, Japan, assignors to Nippon Electric Company Limited, Tokyo, Japan Filed Mar. 30, 1965, Ser. No. 443,834
Claims priority, application Japan, Apr. 11, 1964, 39/20,424
8 Claims. (Cl. 343—6.5)

This invention relates to a time-division radio communication system and more particularly to a communcation system of the kind comprising a plurality of ground stations and a satellite relay station or other relay station situated at a very large distance.

The so-called communication satellites, beginning from Echo No. 1 of August 1960, through Syncom No. 2 of July 1963, have successively been put on their respective orbits by the National Aeronautics and Space Administration of the U.S.A. (NASA) and have in part been used in practical experiments. Among them, stationary statellites exemplified by the Syncom group are believed to be most serviceable with some improvements.

Inasmuch as a communication satellite involves enormous expenditures until it has snugly been put in orbit, it must be utilized as effectively as possible, namely, so as to convey the maximum possible amount of information. As the means for therefore multiplexing channels, conventional proposals have chiefly been directed to frequency division which requires no specific additional installation. This, however, does not provide sufficient multiplexity because of the limited transmission output of the communication satellite. Another multiplexing means having general purpose application is the time-division type. This, however, has not been considered as being adaptable to the radio communication system in question because of fluctuations in the relative position (to be subsequently discussed in the following description) are inevitable to some extent in a communication satellite and other space projectiles, as well as the stationary satellite. More particularly, when a stationary satellite is in a completely ideal state where fluctuation in its relative position does not occur at all, it is possible to maintain the synchronism of the whole communication system on the time-allocation basis predetermined by a consideration of the distance from the ground station to the satellite station. The fact, however, is that considerable fluctuation appears in the relative position due to the movement of the earth and other celestial bodies, to the ebb flow of tide on the earth, as well as other factors. This leads to a collapse of the desired synchronous state. Furthermore, the presence of multipath and/or other transmission phenomenon make it impossible to strictly maintain synchronism for the entire communications system, even with a relay station rigidly installed on a high mountain or tower on the earth, when the relay station is located very distant from the participant ground stations.

An object of this invention is therefore to provide a ground station facility for enabling time-division multiplexing to be used in a radio relay communication system including a plurality of ground stations and a relay station situated on a relay satellite or at other very remote locations, namely, a ground station facility comprising means for compensating for the shift of synchronism originating with fluctuation introduced into time of transmission of signals either by the fluctuation of the relative position of the relay station or by multipath effects or other faults occurring during transmission.

Another object of this invention is to provide a ground station facility comprising means for predicting the time slot alloted to the said ground station at the beginning of transmission and means for maintaining synchronism once it is attained.

In order to achieve such objects, it is required that a ground-station synchronization device be highly precise and reliable. Although the cost for manufacturing such a ground station facility is enormous, the expense is not serious when compared with much more enormous cost of the space communication ground station, whose antenna alone costs approximately one million dollars.

In a communication system of this invention, each ground station comprises means for sending out search pulses by predicting the time slot allotted at the beginning of transmission from the information concerning the orbit of the satellite and the present position thereof and from information obtained from an ephemeris (a publication giving the computed positions of the celestial bodies for each day of the year or for other regular intervals, with other data, for the astronomer and navigator) and means for controlling the time points of transmission of the succeeding search pulses according to the amount of shift of the first mentioned search pulses as received through the intermediary of the satellite relay station from a predetermined time width or interval within the time slot allotted to the ground station seeking to establish its appropriate time slot so that the second mentioned search pulses may be received within the time width and for locking-in such pulses, after once being received within the time width within the said allocated time slot.

Now this invention will be explained with reference to the accompanying drawings, in which.

Figure 4:
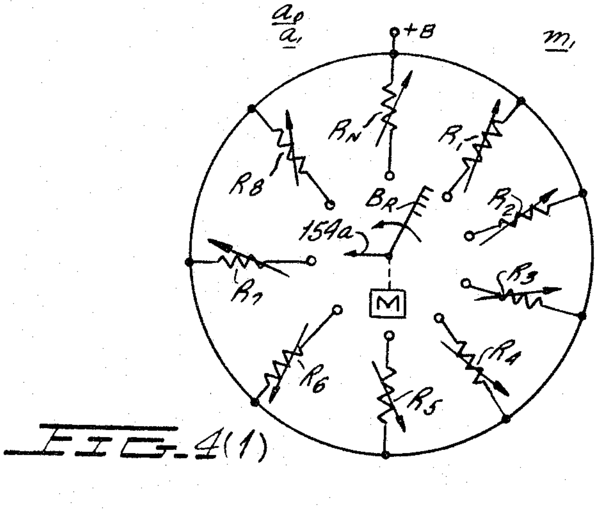
Figure 4:
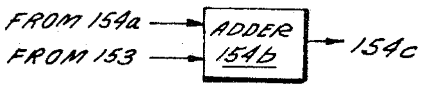
Figure 3:
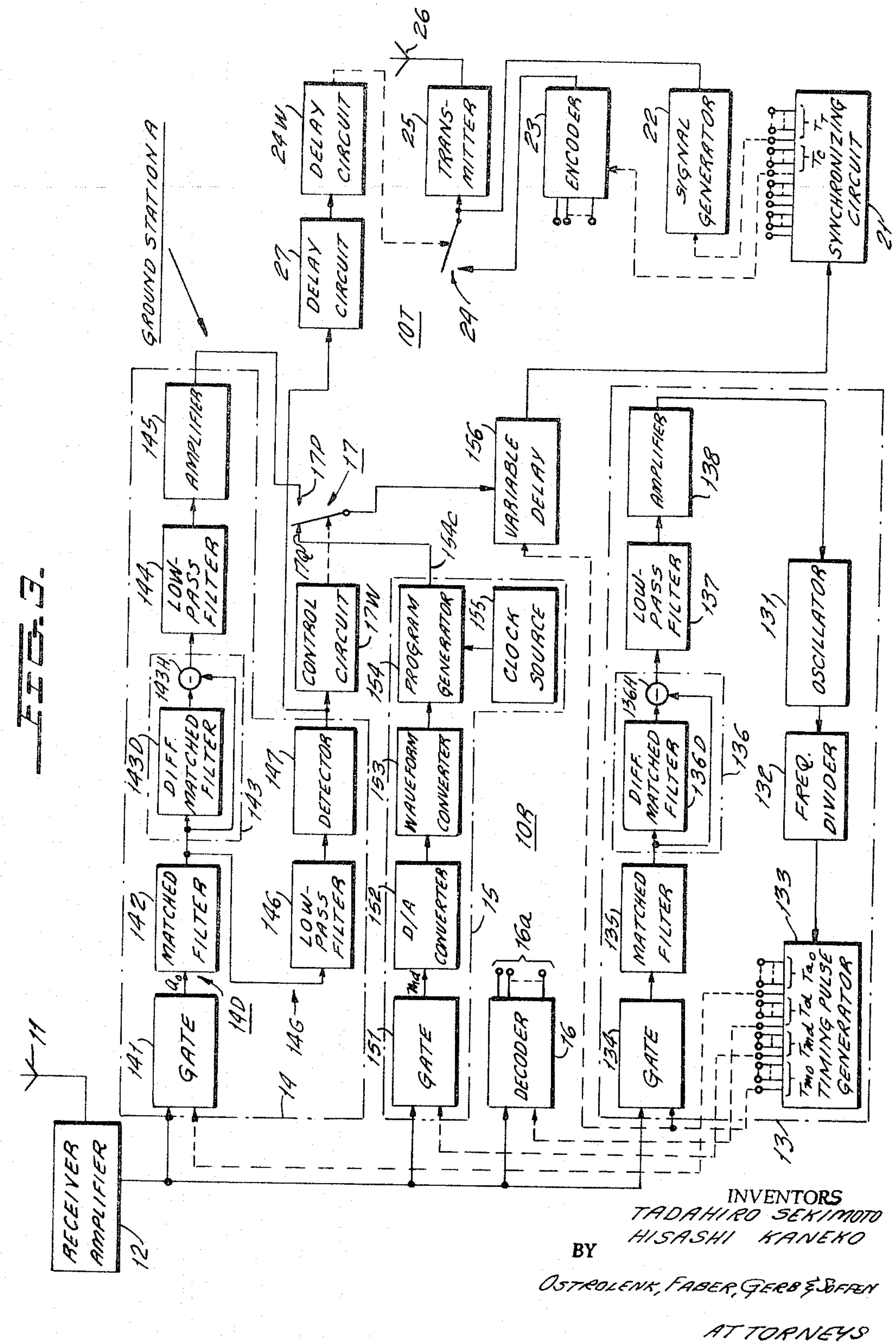
FIGURE 3 is a circuit diagram of a typical subsidiary station among the ground stations in the communication system of this invention.
Figure 5:
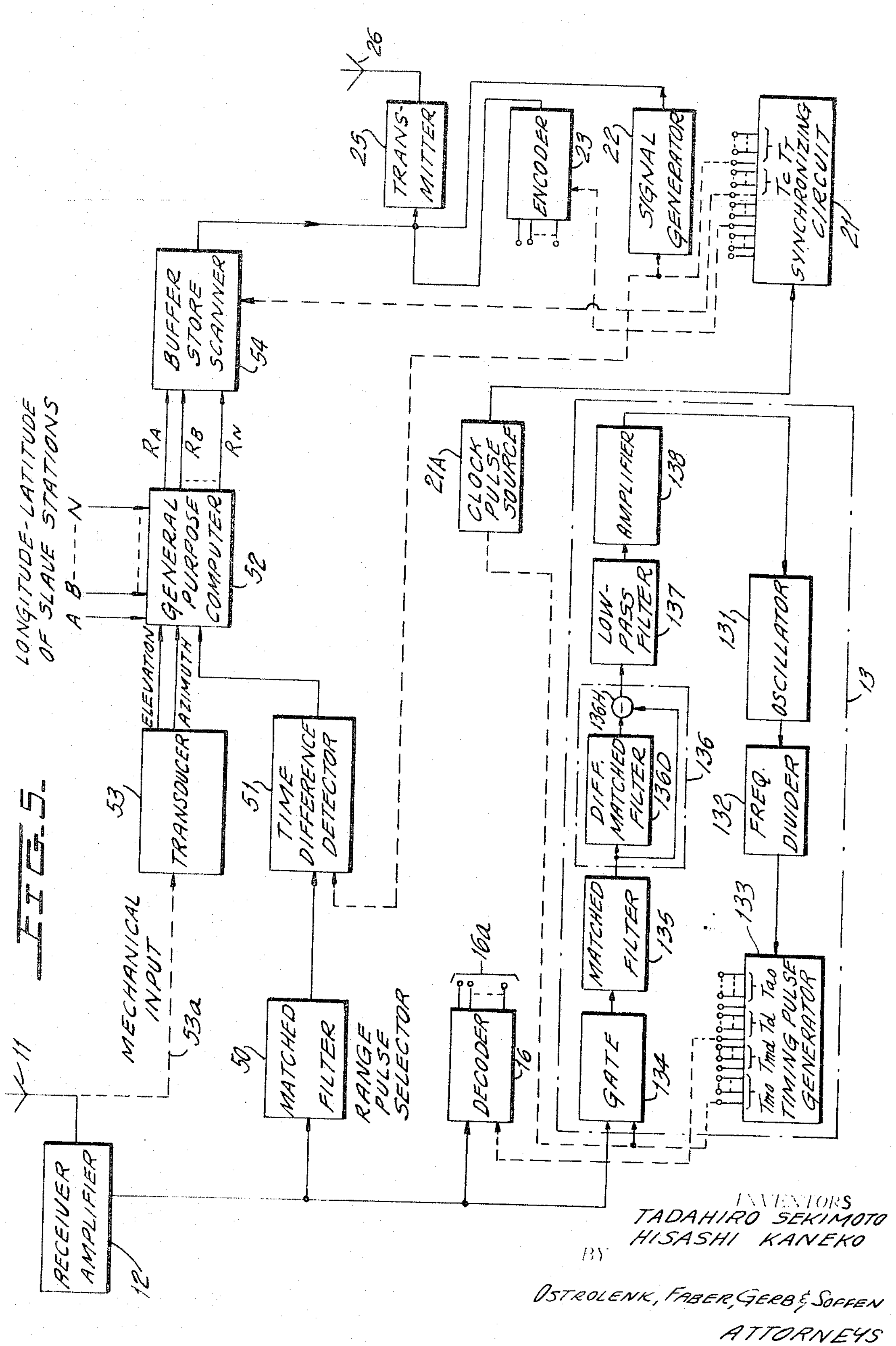

FIGURES 4(1) and 4(2) are circuits showing details of the program generator of FIGURE 3; and FIGURE 5 is a block diagram of the master station.

Figure 1:
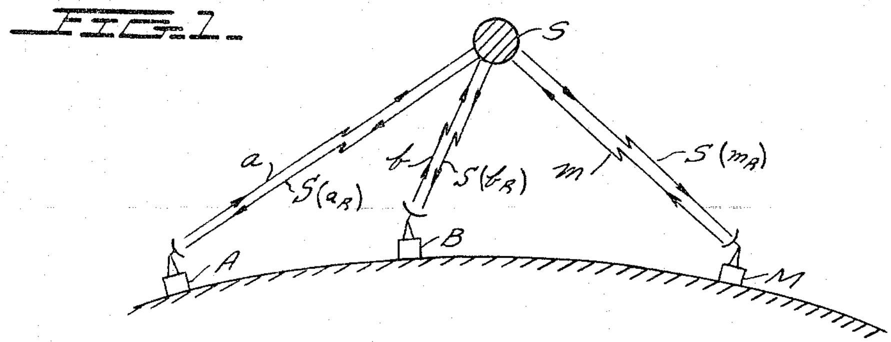
FIGURE 1 is a schematical representation of a communication system of this invention.

Referring to FIGURE 1, a communication system of this invention shown therein comprises a relay station S of a stationary satellite exemplified by a Syncom-type satellite, and ground stations M, A, and B which all are located on the earth within the service area of the satellite relay stations S. In this communication system, microwaves *m*, *a*, and *b* sent out from the respective ground stations M, A, and B undergo relay action of the relay station S and turn into relayed microwaves $m_R$, $a_R$, and $b_R$ which are to be received by the respective ground stations and which all carry similar information composed of the information sent out by the respective microwave transmitters from all of the ground stations. It is to be noted here that the relayed microwaves $m_R$, $a_R$, and $b_R$ reach the respective ground stations at slightly differing points in time. If the service area of the relay stations S spreads over one third of the whole surface of the earth, as is the case with a Syncom satellite, the number of the ground stations which can exchange communication through the relay station S is not limited to three, but may be more.

Inasmuch as a satellite relay station S must be as light in weight as possible, it can only amplify and relay the microwave signals. If no limitation were imposed upon the weight of the relay station S, it would be possible to obtain a time-division communication system by furnishing the relay station S with the function of cyclically selecting the microwave signals sent thereto simultaneously in the same frequency band from the participant ground stations and of amplifying and relaying the cyclically selected microwave signals in the time-division fashion. The fact is, however, that almost all of the weight of a satellite is taken up by the amplifying and relaying equipment for the high-frequency signals, with the result that it is impossible to install such a selecting device on a satellite relay station S. It is therefore indispensable, in order to utilize the satellite relay station S in the time-division fashion, that the high-frequency signals received at the relay station S from the respective ground stations M, A, and B are arranged in a time-division multiplexed manner shown by a waveform $s$ in FIGURE 2(1), where symbols M, A, and B represent the respective time slots allotted to the respective ground stations M, A, and B. More particularly, the relay station S amplifies and relays at the time slot M the high-frequency signal received from the ground station M and at the time slots A and B the high-frequency signals received from the respective ground stations A and B. The amplified and relayed composite signal $s$ is received by each of the ground stations M, A, and B. Each ground station discriminates, by means to be later described, that portion of the signal addressed to its associated ground station.

As mentioned above, the relay station S has the function of merely amplifying and relaying the received high-frequency signals. It is therefore extremely necessary, in order to form the time-division multiplexed high-frequency signal of the waveform $s$, to send out at the ground stations the signals at the respective predetermined time points. For example, the ground station A must send out the signal $a_1$ to be arranged in the destined time slot A in the manner illustrated by a waveform $a$ in FIGURE 2(1), namely, at a time point earlier than the time slot A by the time $t_{AS}$ required for the electromagnetic wave to travel from the ground station A to the relay station S (for Syncom No. 2 spaced above the earth by 36,000 km., the time interval required for return travel is about 0.24 second). Likewise, the ground stations B and M must send out their respective signals $b_1$ and $m_1$ in the manner shown in FIGURE 2(1) by waveforms $b$ and $m$, namely, at time points preceeding the required time slots B and M by time intervals $t_{BS}$ and $t_{MS}$ required for travel of the electromagnetic waves, respectively. It is convenient to select one ground station M from the group of ground stations M, A, and B as a master station serving as the standard of synchronism of the whole communication system. In that case, it is possible to make the master station M send out a signal composed of pulses spaced by a predetermined time interval in the manner illustrated by the waveform $m$ and to make each of the other ground stations or the subsidiary stations A and B thereby to predict the time slot allotted thereto on the basis of the received signal of the waveform $m$. If there were no fluctuation in the relative position of the relay station S and hence in the time intervals $t_{AS}$, $t_{BS}$, and $t_{MS}$ of travel of the electromagnetic wave, it would be possible to fix the time points of transmission of signals at the ground stations A and B preliminarily with reference to the signal of the waveform $m$ received from the master station M. This, however, is impossible because of the reasons previously recited. If a fixed system were employed the occurring fluctuations would cause the time slots to be superimposed upon one another to introduce mutual interference of the channels.

As will become clear by the subsequent description, the master station M must first send signals upon the commencement of service of the communication system in order to provide the reference for the respective time slots of the other stations in the system. This signal of the waveform $m$ sent from the master station M, and included in the signal of the waveform $s$, is employed as the frame synchronizing pulse train and therefore must be provided at substantially regular individual portions of the signal of the waveform $m$ with synchronizing pulses of a specific code word [see FIGURE 2(1) and 2(2)]. When the time $2t_{MS}$ required for return travel of the electromagnetic wave has elasped after commencement of signal transmission, the amplified and relayed signal is received by the master station M, which facility can now calculate, by means of the time interval $2t_{MS}$, the present position of the relay station, to derive a satellite position information signal to be sent together with the next pulse signal as a later-to-be-described satellite-position-correction signal for the subsidiary stations. The ground stations A and B are set into practical operation after the master station M has initiated transmission of the correction signal. For the sake of convenience, the master station M is assumed to have been sending out the signal with the synchronizing pulse train and the satellite-position-correction signal to the ground satations.

In order to prevent the above-mentioned mutual interference of the channels, the system of this invention makes use of search pulses. Considering the ground station A, search pulses $a_0$ are set into the respective pulse signals $a_1$, $a_2$, $a_3$, . . . of the waveform $a$ by means to be subsequently described. It is to be noted here that although FIGURE 2(1) shows the signals as being comprised of a plurality of single pulses, each search pulse $a_0$ is in fact formed of a specific code word having a plurality of pulses to be later described and arranged approximately at the center portion of each time interval, which intervals have the same width as the time slot A. Considering the pulse signal $a_1$, shown in FIGURE 2(3), the search pulse $a_0$ interposed in the time interval of the pulse signal $a_1$ at approximately the center portion thereof, is amplified and relayed within the time interval allotted to the time slot A and is received by the ground station A within that time interval of a received pulse signal $a_1$ as shown in FIGURE 2(2), in the received wave of the waveform $a_R$ which corresponds to the pulse signal $a_1$ shown in FIGURE 2(4).

Figure 2:
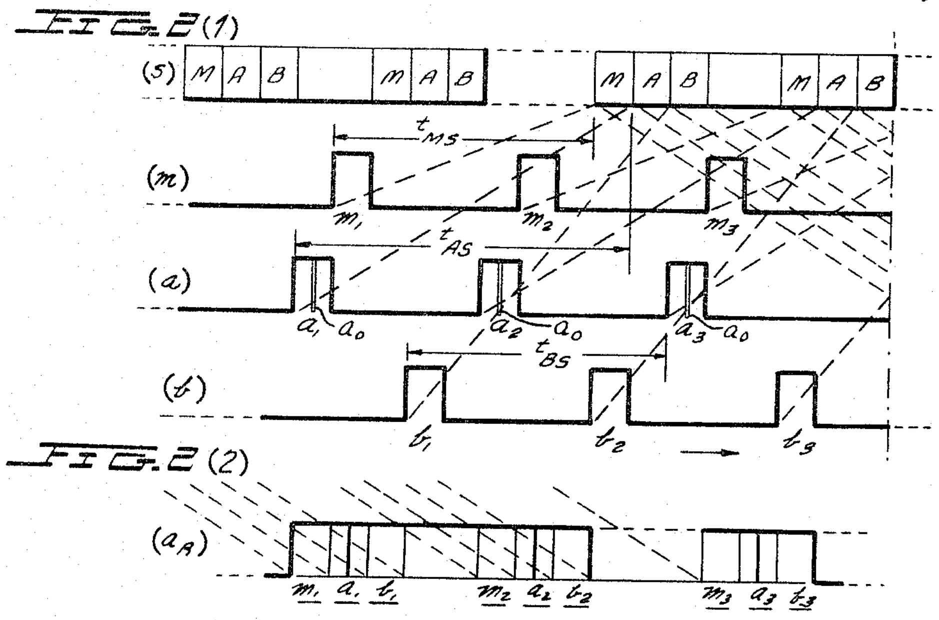
FIGURE 2 shows waveforms for describing the operation of this communication system.
Figure 2:
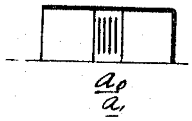
Figure 2:
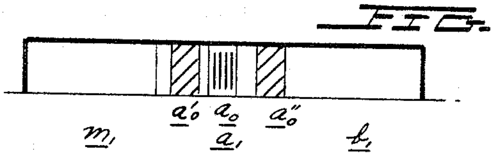

Referring to FIGURE 2(3) which shows the neighborhood of the pulse signal $a_1$ in the received wave $a_R$ on an enlarged scale of the time axis, the search pulse $a_0$ sent in the transmitted pulse signal $a_1$ is received at approximately the center portion of the received pulse signal $a_1$ in the case where the position of the relay station or the distance thereto is substantially equal to the distance predicted in the manner to be subsequently described; or at an earlier time point $a_0'$, or a later time point $a_0''$, in the manner illustrated in exaggerated fashion in FIGURE 2(4), in the case where there is fluctuation of the position from that predicted. If an information signal is sent out throughout the whole time width of the pulse signal $a_1$ while the search pulse is received at such a deviated time position, the information signal overlaps the adjacent received pulses signal $m_1$ or $b_1$ to result in mutual interference. Consequently, it is necessary to correct the time point of transmission of the search pulse $a_0$ so that the pulse $a_0$ may be received only within the predetermined centrally located time range.

Referring to FIGURE 3, a ground station A of a communication system of the invention is shown in block diagram form and comprises a receiver portion 10R: an amplifier-demodulator 12M for amplifying and demodulating in the conventional manner the high-frequency signals received by an antenna 11 to derive the time-division multiplexed signal; a timing-pulse synchronizing circuit 13 responsive to the synchronizing signal contained in the time-division multiplexed signal and sent from the master station M for producing the synchronizing timing pulse trains; a search-pulse selecting circuit 14 for extracting the search pulse selectively from the time-division multiplexed signal; a correction-signal extracting circuit 15 for extracting the above-mentioned satellite-distance-correction signal sent from the master station M; and a decoding and distributing circuit 16.

*Timing pulse synchronizing circuit*

The timing-pulse synchronizing circuit 13 comprises a variable-repetition-frequency pulse oscillator 131, a frequency divider 132 for dividing the output of the oscillator 131 down to a frequency determined by the synchronizing pulse train contained in the signal *m*, a timing-pulse generator 133 for producing timing pulse trains from the pulse train supplied thereto from the divider 132, a synchronizing-signal gate 134 responsive to selected outputs of the generator 133 for gating the time-division multiplexed signal to select the synchronizing signal, a synchronizing-signal selecting matched filter 135 for extracting the synchronizing pulse component contained in the signal *m* supplied from the output of the gate circuit 134 on the bases of both frequency and time, a differential matched filter 136 comprised of a delay circuit 136D and a difference circuit 136H, a low-pass filter 137, and a low-frequency amplifier 138. The oscillator 131 is a voltage-controlled circuit for producing a variable-repetition-frequency pulse train, composed of a voltage-controlled variable-frequency oscillator (VCO) and a pulse shaping circuit, and produces, when no frequency-control voltage is impressed, an output pulse train of a predetermined repetition frequency. The timing-pulse generator 133 comprises a delay line for delaying by a predetermined amount each pulse of the pulse train supplied from the frequency divider 132. A plurality of output terminals grouped by the respective numbers into groups $T_{a0}$, $T_{md}$, and $T_{m0}$ are connected to the delay line at preselected points, and, each time a pulse is supplied at the input, pulses are successively produced delayed from the pulses of the timing pulse trains at the respective output terminals. Those pulses among the timing pulse trains which are produced at the output terminal group $T_{m0}$ are used to selectively enable the gate 134 so as to extract the synchronizing pulse component $m_0$ from the time-division multiplexed signal and impress this signal component upon the matched filter 135. The synchronizing pulse component $m_0$ passed by the matched filter 135 is impressed upon the differential matched filter 136, and then supplied, through the low-pass filter 137 and the low-frequency amplifier 138, to the oscillator 131 as the frequency-control signal. This control signal pulls the timing-pulse generator 133 into the synchronized state from the state assumed before appearance of the control signal where the generator was self-oscillating at a predetermined (and typically different) repetition frequency. This timing-pulse generator 133 may be comprised of any of the known prior art circuits and will not be described in detail.

*Search pulse selecting circuit*

The search-pulse-selecting circuit 14 comprises a search-pulse extracting portion 14D which, in turn, comprises a gate 141, gated by the timing pulse trains supplied from the output terminal group $T_{a0}$ of the timing-pulse generator 133, for extracting the search-pulse component $a_0$ contained in the time-division multiplexed signal; a matched filter 142; a differential matched filter 143 for producing the output only when the search pulse component $a_0$ is received within a predetermined time width; a low-pass filter 144; and a low-frequency amplifier 145 and a switching-signal generator portion 14G which, in turn, comprises a low-pass filter 146 supplied with the output of the matched filter 142, and an envelope detector 147. As for such use of a matched filter, no further description will be made because explanation may be found in an article entitled "Delay-lock Tracking of Binary Signals," written by J. J. Spilker in "Transactions of IEEE, PGSET," March 1963, pages 1–8. The former circuit portion 14D extracts the search pulses $a_0$ and the latter circuit portion 14G produces a control signal representing the time of arrival of the search pulse $a_0$.

*Correction signal extracting circuit*

The correction-signal extracting circuit 15 comprises a gate 151, gated by the timing pulse trains supplied from the output terminal group $T_{md}$ of the timing-pulse generator 133, for extracting the correction signal component $m_d$, a digital-to-analog converter 152, a waveform converter 153, a program generator 154, and a standard clock source 155. As shown in FIGURE 4(1), the program generator 154 comprises, for example, a plurality of adjustable resistors $R_1$–$R_N$ having respective programmed resistance values and arranged in circular fashion, a constant voltage source B+, a low-speed motor M responsive to the standard time pulses supplied from the clock equipment 155, and a brush BR, driven by the motor M for making selectively wiping contact with one end of each of the resistors to produce a satellite-position representing analog signal by calculating, through an ephemeris with reference to the standard time signal, the effect introduced by the earth and other celestial bodies into the relative position of the satellite relay station S. The resistors $R_1$–$R_N$ are variable resistors whose resistances may be programmed manually or automatically by an electronic computer. As for compensation for the satellite position by the ephermeris, no detailed description will be given herein because such compensation techniques are described in detail in an article entitled, "Radar Exploration of Venus," and, particularly, in the explanation made with reference to FIGURES 8 and 9 of the article, written by W. K. Victor et al. in "Technical Report," vol. 32, No. 132, published (Aug. 1, 1961) by Jet Propulsion Laboratory, California Institute of Technology, U.S.A.

In the case where a fluctuation of position of the satellite relay station involves only the fluctuation predictable by the ephemeris and is not due to changes caused by the ebb and flow on the earth or other factors, it is possible to formulate the search pulse train only by the position-representing signal produced in response to the standard time-pulses of the standard clock equipment but, inasmuch as unpredictable fluctuation of position is inevitable, use must be made of the satellite-position-correction signal sent out at the master station M at the time points of pulse signals $m_1$, $m_2$, $m_3$, . . . .

The correction signal component $m_d$ selected by the gate 151 is converted by the digital-to-analog converter 153 into a preferable waveform and is then supplied to the program generator 154 as the control voltage. As shown in FIGURE 4(2) the control of the generator 154 by this control voltage is carried out so that the adder **154*b* of FIGURE 4(2) may derive the sum of the control voltage 154*a* and the satellite-position representing analog voltage from 153 to produce the voltage sum at 154*c***. This sort of control can also be performed by other well known manner and will not be explained in more detail.

The decoding and distributing circuit 16, supplied with the timing pulse trains from the output terminal group $T_d$ of the receiver timing-pulse generator 133, selects the information signal component from the time-division-multiplexed signal, decodes the same, and distributes the decoded information signals of every channel to a plurality of output terminals **16*a***, respectively, in the manner known in the art. Inasmuch as these decoded information signals may involve those not addressed to the subsidiary station A, an additional device is necessary in practice for discriminating the signals destined for the ground station A. Such a device, however, has no direct relation with the invention and will not be described here.

As for the search-pulse selecting circuit 14, the low-pass filter 146 is connected, in common with the differential matched filter 143, to the output of the matched filter 142, and selects the search pulse component and imparts the said component to the envelope detector 174. The detector 147 envelope-detects the low-frequency component selected by the low-pass filter from the output of the matched filter 142 and thereby produces a switching control signal.

The switching control signal therefore is a low-frequency signal representing whether or not each of the search pulses are being received within a predetermined time interval, and is supplied to a search-pulse-transmission controlling circuit 17W which comprises, for example, a relay winding for controlling such switching operation of the search-pulse-transmission switching circuit 17, as may make or break the relay contact 17. One contact 17P of two fixed contacts of the switching circuit 17 is supplied through the amplifier 145 with the search pulses selectively extracted at the extracting circuit 14 from the time-division multiplexed signal, while the other contact 17Q is supplied with the output pulses of the program generator 154. The search-pulse transmission switching circuit 17 selectively switches to one of its outputs under control of the controlling circuit 17W, the output of the program generator 154 (i.e. the input to the contact Q), when each of the search pulses $a_0$ is not received at the center portion of the time slot of the received signal $a_1$ and the output of the amplifier 145 (i.e. the input to the contact P), afer a search pulse $a_0$ has successfully been received within a predetermined central range of the time slot. The selective output of the switching circuit 17 is supplied as a delay control input to a variable delay circuit 156 for the output pulse trains of the output terminal group $T_{m0}$ of the receiver timing-pulse generator 133. This variable delay circuit 156 comprises a delay line and a motor (responsive to the delay control input) for driving brushes slidable along this delay line to supply delayed pulse trains to the transmitter timing-pulse synchronizing circuit 21. Said pulse trains are, in turn, received from the output terminal group $T_{m0}$ of the timing-pulse generator 133.

The receiver timing-pulse synchronizing circuit 13, which is similar to the timing-pulse synchronizing circuit 21, comprises a delay line having a plurality of output terminal group $T_t$, $T_c$, and others and successively produces, in response to the pulse trains supplied from the variable delay line 156, timing pulse trains appearing at its output terminals. Consequently, the time points at which the pulses appear at a certain terminal of those groups of terminals depend on the time points of arrival of pulses supplied from the variable-delay circuit 156. As a result, those time points among the transmitted signal which correspond to the search pulses are controlled by the search pulse supplied to the delay circuit. Among the output pulse trains produced by this circuit 21, the pulse trains produced at the output terminal group $T_t$ are supplied to a transmitter synchronizing-signal generator 22 to trigger the signal generator circuit 22, and the timing pulse trains produced at the output terminal group $T_c$ are supplied to an encoder 23 to control the timing of this encoder 23. The encoder 23, under control of these timing pulse trains and in the manner known in the art, converts information signals of a plurality of channels, supplied thereto at a like number of input terminals, into time-division-multiplexed coded signals, which are sent through an information-signal-transmission switching circuit 24, which is under the control of an information-signal-transmission controlling circuit 24W, to transmitter 25. The transmitter 25 frequency-converts the coded signals to be transmitted, power-amplifies, and transmits the resulting signal through an antenna 26 towards the satellite relay station S.

The output of the detector 147 is supplied to the search-pulse-transmission controlling circuit 17W, and to a delay circuit 27. The output of delay circuit 27 couples the delayed output to the information-signal-transmission controlling circuit 24W, which maintains the switching circuit 24 in open position, as shown in FIGURE 3, while the output of the detector 147 is not supplied thereto through the delay circuit 27, namely, while the search pulses are not in the above-mentioned preferable time positions. The switch 24 is closed when the appropriate search pulse output is supplied to the detector 147. The delay period of delay circuit 27 is made sufficiently longer than the time interval from the time point at which the search pulses have begun to be received at the respective above-mentioned preferable time points to convert the movable contact of the search-pulse-transmission switching circuit 17 to the fixed contact 17P until the later-to-be described feedback loop reaches stationary state, so that the information signal output may be sent out from the encoder 23 after the search process has sufficiently been carried out.

As will have become clear from the above, the transmission timing-pulse synchronizing circuit 21, the synchronizing signal generator 22, the encoder 23, the information-signal-transmission switching circuit 24, and the transmitter 25 constitute a transmitter portion 10T of the ground station A.

As will have also become clear from the above, the ground station A maintains its synchronism with the system as a whole through the search process of sending out, prior to transmission of the information signals, search pulses at such time points as may coarsely be determined by the ephemeris, the frame synchronizing signal and the satellite-distance correction signal received from the master station, of detecting the relative time positions of the search pulses received after the time interval for return travel of the electromagnetic wave, namely, the time positions of such search pulses relative to the frame synchronizing pulses, and of controlling in response to the results of the detection, the time positions of transmission of the search pulses to shift the time positions of the received search pulses towards the preferred positions, and through the locking-in process of locking-in, after the search process is completed, the search pulses by forming a feedback loop for the received search pulses between ground station and satellite.

Although only the ground station A has been explained with reference to FIGURE 3, it should be noted that the ground station B is substantially of the same construction. As regards the master station M, shown in FIGURE 5, the construction is not essentially different from the ground station A except that the master station M does not require those circuits corresponding to the search-pulse selecting circuit 14, and the switching circuits 17 and 24, respectively. In lieu of these circuits the master station utilizes a synchronizing-signal generator and a satellite-position-correction signal generator, since it is the function of the master station to determine and control the reference of synchronism of the whole communication system.

FIGURE 5 is a block diagram depicting the arrangement of the master station M. The timing pulse synchronizing circuit 13 and the decoder 16 are substantially identical to those circuits bearing like numerals shown in ground station A of FIGURE 3, and no detailed description will, therefore, be given herein.

The following description sets forth the manner in which the highly accurate time slot allocation is maintained during system operation:

Transmitter 25 sents out a distinctive signal pattern directed to the satellite body S by antenna 26. The distinctive pattern may be that employed in conventional binary code radar systems well known to the art.

The signals are received, amplified and relayed by the satellite body S so as to be received by antenna 11. The receiver amplifier 12 amplifies and demodulates the high frequency signals received by antenna 11 in the conventional manner. The received and demodulated signals are impressed upon a range plus selector which is comprised of a matched filter 50 substantially identical to the matched filters 135 and 142 previosuly described. The output of matched filter 50 is impressed upon one input of a time difference detection circuit 51 whose remaining input terminal receives the clock pulse timing signal from clock pulse source 21*a*, which is coupled to the time difference detection circuit 51 through synchronizing circuit 21. The output of circuit 51, which constitutes the time difference between clock pulse source 21*a* and the received code pattern, is impressed upon one input of a general purpose computer 52.

The general purpose computer 52 may be any conventional computer capable of carrying out calculations to produce the ranging data necessary for approximating the time slots for each station. The remaining input data to geenral purpose computer 52 is comprised of the following input information:

Antenna 11, which is a directional antenna, is mechanically coupled through a linkage represented by dotted line 53*a*, to suitable transducing means 53. The physical attitude or alignment of antenna 11, which may be considered to be constituted of an elevational and azimuthal angle, is converted from physical or mechanical form into suitable electronic signals at the output of transducer 53 representing the elevational and azimuthal angles of antenna 11. This information is supplied as additional input information to general purpose computer 52.

The positions of the stations AB . . . N of the system, in terms of latitude and longitude readings, is applied as additional input information. It is obvious that if the stations AB . . . N are fixed sites, the latitude and longitude information associated therewith may be pre-set into the computer. If the sites are mobile sites, such latitude and longitude information will thereby require updating as the mobile stations move to new sites.

Computer 52, having received all of the above input information, calculates the distance between the satellite body S and each of the ground stations A, B, and so forth, constituting the communications system. This information is generated in binary form by the computer which is provided with suitable storage means to allow sequential scanning and readouts of the computed ranging data $R_A$, $R_B$ and so forth. The scanning rate of the ranging data is controlled by the clock pulse source and synchronizing circuits 21*a* and 21, respectively. As the ranging data is scanned, it is coupled to the input of transmitter 25 together with frame synchronizing signals M generated by signal generator 22.

The encoder 23, which is substantially identical to encoder 23 of FIGURE 3, it employed for sending data from the master station M to the slave stations A, B, and so forth. However, if the master station M is only being used for pulling the system into synchronism, the encoder 23 may be omitted, if desired.

In the above description it has been assumed that each of the signals *m*, *a*, and *b* shown in FIGURE 2(1) is a time-division multiplexed PCM signal. Each, however, need not be so composed, but may be, for example, a sampled analog signal of a single channel. Furthermore, it will be understood that it is possible to modify the construction of a subsidiary station shown in FIGURE 3 in various ways. For example, the receiver timing-pulse synchronizing circuit composed of a frequency divider 132 and the timing-pulse generator 133 may be replaced with a shift register or other known circuit. The search-pulse-transmission switching circuit 17 and/or the information-signal-transmission switching circuit 24 illustrated as a relay contact, may be replaced by a known electronic switching device having switching transistors or the like. Also, the above description has mainly referred to a satellite relay station as the relay station S. It should, however, be clearely understood that this invention is also applicable for advantageous use in cases where the relay station S is very distant and multipath and like adverse effects are appreciable and hence, serious. Furthermore, the number of the ground stations is not restricted to three, namely, the three stations M, A, and B, but may be augmented whenever necessary or desired. Consequently, the patent right allowed to the application covers all the radio relay communication systems such as claimed in the following claims for patent.

Although there has been described a preferred embodiment of this novel invention, many variations and modifications will now be apparent to those skilled in the art. Therefore, this invention is to be limited, not by the specific dislosure herein, but only by the appending claims.

What is claimed is:

1. Time-slot determining means for use in subsidiary stations of a time-division radio relay communication system typically comprised of a relay station, such as a satellite relay station, positioned at an appreciable distance from a plurality of ground stations which are located within the service area of said relay station and which interchange relayed radio communication at a substantially equal frequency band by using said relay station in common but at respectively different predetermined time slots, characterized in that certain of said ground stations employ time-slot determining means comprised of:

first means for predicting one time slot among the plurality of said time slots which is allotted to its associated station;

second means for successively sending out search pulses at the time points determined by the result of prediction;

third means for detecting the time points of the search pulses returning back through said relay station to the associated subsidiary station;

fourth means for controlling in response to the result of such detection the time points for sending out the succeeding search pulses in such a manner that these succeeding search pulses may return to their associated station at the preferred time positions for each associated subsidiary station; and fifth means for maintaining the state where said succeeding search pulses return to their associated station at the respective preferred time positions.

2. Time-slot determining means for use in subsidiary stations of a time-division radio relay communication system typically comprised of a relay station, such as a satellite relay station, positioned at an appreciable distance from a plurality of ground stations which are located within the service area of said relay station and which interchange relayed radio communication at the substantially equal frequency band by using said relay station in common but at respectively different predetermined time slots, characterized in that said ground stations are composed of a plurality of subsidiary stations and a master station for sending out to said relay station at a predetermined repetition frequency a transmitter signal comprising both a synchronizing signal serving as the reference of said time slots and a satellite-position-representing signal; and a plurality of subsidiary stations, said time-slot determining means comprising:

first means for sending out search pulses at time points determined by a synchronizing signal and satellite-position-representing signal received from the master station through said relay station and by the information obtained from an ephemeris;

second means for detecting whether each of the search pulses has returned through said relay station to the associated station prior to or subsequent to a preferred time position predetermined with reference to the pulses of said synchronizing signal;

third means for controlling, in response to the result of the detection, the time at which succeeding search pulses are transmitted so that each of these pulses may return to the associated station at the said preferred time position; and fourth means for maintaining synchronism, once detected, where the search pulses return to the associated station at the respective preferred time positions.

3. A ground station for use in a time-division radio relay system typically comprised of a master station, at least one ground subsidiary station and a satellite employed as a relaying means wherein said master station transmits a signal for synchronizing the stations of the system into appropriate time slots, said ground station comprising:

transmitter means;

first means for controlling said transmitter means to generate search pulses to said relay station at a predetermined rate;

second means for receiving signals from the master station to generate timing pulses at a predetermined rate;

third means responsive to return of search pulses reflected from the relay station for generating a signal representing the difference between the time slots occupied by the estimated pulse rate and the reflected pulse rate;

fourth means for indicating the receipt of search pulses;

fifth means for generating a signal which is an estimate of the appropriate time slot in the absence of search pulses;

variable delay means coupled to said switch means for delaying the pulses generated by said first means in accordance with the output of said switch means; and switch means controlled by said fourth means for selectively coupling either said first means or said fifth means to said variable means in the presence or absence, respectively, of search pulses.

4. The ground station of claim 3 further comprising:

sixth means coupled to said first means for generating encoded information signals to control said transmitter means;

second switch means for selectively connecting said sixth means to said transmitter means; and control circuit means for actuating said second switch means under control of said fourth means.

5. The ground station of claim 4 wherein said control circuit means includes:

delay means for delaying connection of said sixth means to said transmitter means for a time period sufficient to allow the synchronizing operation to be completed.

6. The ground station of claim 3 wherein said second means is comprised of:

voltage controlled oscillator means;

timing pulse generator means for generating timing pulses at a rate controlled by said oscillator means;

gating means for passing signals received from the master station occurring simultaneously with said timing pulses; and means for generating a voltage representing the arrival of said master station signals relative to said timing pulses, said voltage controlling the frequency rate of said voltage controlled oscillator means.

7. The ground station of claim 6 wherein said third means is comprised of:

means for generating a voltage representative of the arrival of reflected search pulses relative to the said timing pulses for controlling said variable delay means.

8. The ground station of claim 6 wherein said fifth means is comprised of:

seventh means for generating a voltage representing an estimate of the relative conditions between the ground station and the relaying station to initially begin said searching operation; and means for altering the output of said seventh means upon receipt of search pulses at said ground station to increase the accuracy of said seventh means.

References Cited by the Examiner

UNITED STATES PATENTS 3,222,672 12/1965 Forestier ------------ 343—7.5

CHESTER L. JUSTUS, *Primary Examiner.*

D. C. KAUFMAN, *Assistant Examiner.*